C. L. PECK.
TREATMENT OF SEWAGE.
APPLICATION FILED MAR. 27, 1920.

1,392,212.

Patented Sept. 27, 1921.
3 SHEETS—SHEET 2.

Inventor
Charles Lee Peck
By his Attorneys
Pennie, Davis, Marvin & Edmonds

Fig. 4.

UNITED STATES PATENT OFFICE.

CHARLES LEE PECK, OF NEW YORK, N. Y., ASSIGNOR TO THE DORR COMPANY, A CORPORATION OF DELAWARE.

TREATMENT OF SEWAGE.

1,392,212.  Specification of Letters Patent.  Patented Sept. 27, 1921.

Application filed March 27, 1920. Serial No. 369,202.

*To all whom it may concern:*

Be it known that I, CHARLES LEE PECK, a citizen of the United States, residing at New York city, in the county of New York, State of New York, have invented certain new and useful Improvements in the Treatment of Sewage; and I do hereby declare the following to be a full, clear, and exact description of the invention, such as will enable others skilled in the art to which it appertains to make and use the same.

This invention relates to the treatment of sewage and similar liquors, such, for example, as domestic or municipal sewage, and the like. More particularly, the invention relates to the treatment of sewage by aeration in the presence of bacterial sludge, by the method commonly known as the activated sludge process.

The invention contemplates the provision of certain improvements in the treatment of sewage by the so-called activated sludge process.

In the treatment of sewage by the activated sludge process, the sewage is aerated in the presence of activated sludge, by blowing air, preferably in a fine state of subdivision, through the sewage, whereby aerobic organisms are developed which, in the course of their growth or by means of conditions provided by their growth, oxidize or otherwise modify the colloidal and soluble materials in the sewage causing them to settle out upon standing in the form of flocculent particles. After the necessary aeration, the treated sewage is subjected to sedimentation and decantation to settle out the flocculated particles, called the activated sludge, and to permit the escape of a relatively clear effluent by overflow. The activated sludge may be dehydrated in any appropriate manner and possesses valuable properties for fertilizing purposes.

The activated sludge is composed in part or in whole of a characteristic flora of bacteria and other organisms which, in the presence of air, possess the power of promoting the oxidation of the organic material in the sewage, including nitrogenous material, which is thus converted in part into soluble products including nitrates, and in part into a coagulate or sediment which readily settles out of solution. The additional sludge or sediment which accumulates as fresh portions of sewage are subjected to the treatment can be collected by sedimentation. The marketable value of the sludge so produced and the clear innocuous character of the effluent make this process of treating sewage a particularly advantageous one.

The present invention involves in the first place an improved method of preliminarily treating the raw sewage preparatory to the biological clarification. Ordinary domestic or municipal sewage contains varying amounts of solid matter, some of which is rich in nitrogen and some of which contains little or no nitrogen. The purpose of the preliminary treatment of the sewage contemplated by the present invention is to remove from the raw sewage the nitrogen-poor solid matter, without removing the nitrogen-rich solid matter, whereby the nitrogen-rich solid matter in suspension in the sewage is subjected to the aeration treatment characteristic of the activated sludge process. Thus, in accordance with this aspect of the invention, the raw sewage is subjected to a classifying operation in the course of which substantially all of the nitrogen-rich solid matter is selectively comminuted and passed through a screen together with the bulk of the liquid leaving behind solid matter poor in nitrogen which is appropriately removed from the liquor.

The classifying treatment contemplated by the present invention involves the steps of agitation and screening in the course of which the nitrogen-rich solid matter contained in the raw sewage is broken up into sufficiently fine particles to pass through the interstices of the screening medium while the nitrogen-poor solid matter is not broken up and is therefore unable to pass through the screen and being left behind may be removed in any appropriate manner. I have employed with excellent results in the classifying treatment a rotary screen of the drum type having a cylindrical screening surface or medium rotatably mounted in a receptacle containing the raw sewage. The screening medium may advantageously be of about 20 mesh to the inch. The rotation of the rotary screen is so conducted that considerable agitation of the sewage is effected, thereby beating and breaking up the fecal and other nitrogen-rich solid matter in the sewage until it passes through the interstices of the screen. By this classifying action, matches, paper, corn, sand and similar solid matters poor in nitrogen are thrown out and rejected, while solid matters rich in nitrogen are reduced to a sufficiently small size to pass through the screening medium and may be subsequently recovered from the treated sewage, either in the sludge or in the effluent.

The screened sewage liquor is conducted from the classifying apparatus to one or more aeration tanks. In these tanks, the sewage is subjected to aeration in the presence of activated sludge. In accordance with the invention, a plurality of aeration tanks are connected in series, and the sedimentation and decantation treatment, whereby the clear effluent is separated from the activated sludge, is carried out in the last tank of the series, or in an auxiliary sedimentation and decantation apparatus provided especially for this purpose. In the other aeration tanks of the series, the sewage liquors are subjected to aeration in the presence of activated sludge, the suspended solids being retained in each unit in closed-circuit circulation, except as displaced by incoming suspended matter, as hereinafter described. The present invention further contemplates an improved method of aerating the sewage. Thus, in accordance with this aspect of the invention, the sewage is subjected in the presence of activated sludge to the action of finely disseminated air in such a manner as to produce by the levitating action of the air a continuous circulation of the liquor, and an appropriate fraction of the circulating liquor is permitted to escape from the circuit and to flow into a body of similarly treated liquor undergoing sedimentation and decantation. Thus, in accordance with this feature of the invention, the suspended matter in the sewage is repeatedly circulated in the aerating tank by means of an air lift effect, and all settling solid particles are directed toward the influence of the circulating instrumentality so as to insure thorough and complete aeration of all the solid and colloidal matters suspended in the sewage.

The novel features of the present invention which I believe to be patentable are definitely pointed out in the appended claims. The treatment of sewage in accordance with the improvements of the invention and the construction and mode of operation of the improved apparatus which I have particularly devised for carrying out these improvements will be understood from the following description taken in conjunction with the accompanying drawings, in which—

The improvements of the present invention are particularly adapted for the treatment of municipal or domestic sewage and similar liquors. Raw domestic sewage contains various substances, such as soluble salts in solution, colloidal matter, such as soaps, solid matters having a relatively high nitrogen content, such as fecal matter, and solid matters containing little or no nitrogen, such as paper, fruit and vegetable parings, etc. As a result of the treatment contemplated by the present invention, solid matters poor in nitrogen are first removed from the sewage, after which the sewage is treated to effect the oxidation of reducing agents contained therein, the conversion of nitrogen compounds into available and substantially non-putrescible forms of nitrogen and the elimination of dangerous bacilli. Moreover, the improvements of the invention may advantageously be employed to enrich or increase the amount of available nitrogen in the sewage by the fixation of atmospheric nitrogen introduced in the course of the aeration. To this end, I have found it desirable to maintain in the sewage an environment favorable to the growth and propagation of nitrogen-fixing bacteria and, if necessary, supplying to the sewage appropriate agents for stimulating the growth and propagation of such bacteria. This enrichment of the available nitrogen content of the sewage is more particularly described and claimed in my copending application for Letters Patent of the United States, Serial No. 369,201, filed March 27, 1920.

Figures 1, 2:
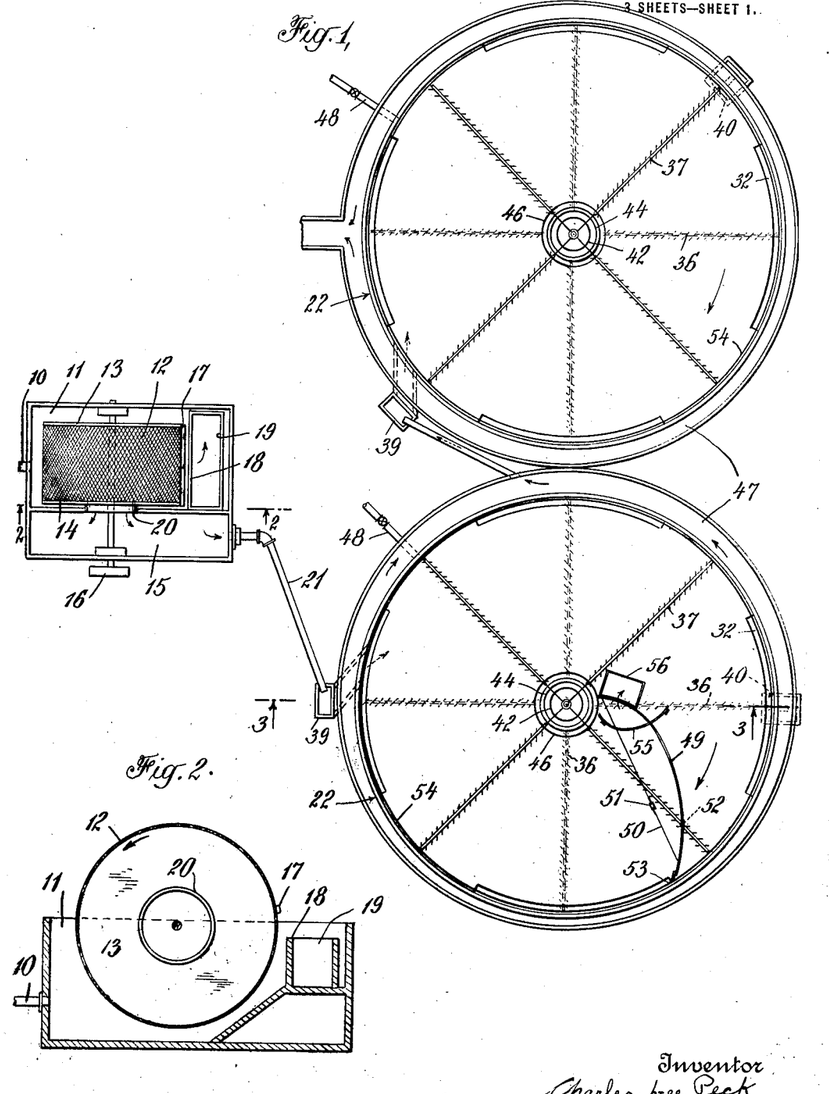
Figure 1 is a plan view of an equipment adapted for the practice of the invention.
Fig. 2 is a sectional elevation, on the section line 2—2 of Fig. 1, of a suitable apparatus for carrying out the classifying treatment contemplated by the invention.

Referring now to Fig. 1 of the accompanying drawings, the raw sewage is conducted to the classifying apparatus by means of a main or conduit 10. The classifying apparatus comprises a screening chamber 11 into which the raw sewage is introduced. A cylindrical screen 12 is rotatably mounted in the screening chamber 11. The screen has two circular ends 13 and 14, the latter having an axial outlet 20 for the discharge of screened liquor, containing the comminuted nitrogen-rich solid material, into a compartment 15. The screening medium may advantageously be a wire screen of 25 gage wire with 20 to 24 meshes to the inch. The screen may be rotated by means of a pulley 16 from any suitable power source at the rate of approximately 20 R. P. M.

A transverse baffle or cleat 17, about one inch square in section, is secured to the face of the rotary screen, and serves the two-fold function of lifting the nitrogen-poor solid material in the sewage upwardly to effect its discharge over an adjacent partition or wall 18 and of producing a certain agitation of the sewage.

The vertically disposed partition or wall 18 is arranged adjacent and in proximity to the upwardly moving side of the rotating screen. This partition may serve the purpose of dividing the tank into the screening chamber 11 and a solids-collecting compartment 19. In the accompanying drawings, the solids-collecting compartment 19 is represented in the form of a trough, from which the solid material may be removed in any appropriate manner, as, for example, by a removable cage or perforated basket, or continuously by a bucket elevator or similar elevating means.

As the screening drum 12 rotates, the transverse baffle 17 lifts up the nitrogen-poor solid matter in the sewage in such a manner that the solid matter is hurled over the wall or partition 18 into the solids-collecting compartment 19, from which the accumulated solids may be appropriately withdrawn and subjected to such further treatment as desired. The baffle 17 lifts considerable quantities of liquor into the solids-collecting compartment, and this liquor may flow back into the screening chamber over the top of the wall 18. With a classifying apparatus of the particular construction illustrated in Figs. 1 and 2 of the accompanying drawings, the solids-collecting compartment 19 will, in operation, be usually filled with liquor. The nitrogen-poor solid matter which is thrown over the wall 18 will sink through the liquor in the compartment 19 and accumulate on the bottom of this compartment, while any lumps of fecal matter which are thrown over the wall 18 will float and will be returned to the screening chamber by the flow of excess water from the compartment 19 back into the screening chamber. The result is that any fecal matter discharged into the compartment 19, is drawn back into the screening chamber to be further disintegrated until it eventually passes through the screening drum.

The raw sewage is continuously fed from the conduit 10 into the screening chamber 11 and is there subjected to agitation, as the result of the rotation of the screening drum and the action of the transverse baffle thereon, and the nitrogen-rich solid matter in the sewage is beaten and broken up, so that substantially all of it passes through the screen. The screened sewage containing substantially all of the nitrogen-rich solid matter in a colloidal or in a quasi-colloidal or in a suspended condition flows from the interior of the screening drum through the centrally disposed outlet 20 into the compartment 15.

The operation of the classifying apparatus as a comminuter of nitrogen-rich solid matter and as a classifier between nitrogen-rich and nitrogen-poor solid matters is a particularly beneficial and advantageous feature of the present invention. This classifying operation is of special importance in connection with the treatment of domestic sewage, which contains easily comminuted nitrogen-rich solid matter and difficultly comminuted nitrogen-poor solid matter. Thus, as an incident to the stirring and agitation resulting from the rotation of the screening drum, there is produced a crushing action which breaks up the so-called "floaters" containing a relatively high percentage of nitrogen. In fact, this stirring and agitation breaks up the greater proportion of all of the nitrogen-rich solid material contained in the raw sewage, so that the comminuted material passes through the interstices of the screening drum. I have thus found, in the treatment of domestic sewage, that the screened liquor contains approximately 150 parts in a million of suspended solid matter which contains from 4 to 5% of nitrogen (estimated on a dry basis in the form of ammonia). On the other hand, the solid matter collecting in the compartment 19 will contain varying small amounts of nitrogen depending on the season of the year, for example, from 0.5 to 2% of nitrogen calculated on a dry basis and in terms of ammonia.

The nitrogen-poor solid material withdrawn from the compartment 19 may be disposed of in various ways. For example, it may be dried and incinerated. Or, it may be crushed into particles of a sufficiently small size to pass through the interstices of a screen of substantially the same mesh as the rotating screen 12, and this crushed material may then be added to the screened sewage where it will serve, in the subsequent aeration, as a food for the organisms taking part in the treatment and in this manner, its nitrogen content, though small, may be conserved and recovered.

The screened sewage, containing the comminuted nitrogen-rich solid matter, is discharged through a conduit 21 into the first of the aeration tanks. In the accompanying drawings, I have illustrated two aeration tanks operating in series. It will, of course, be understood that more than two tanks may be employed in series, but in actual operation I have obtained excellent results with the installation illustrated in the accompanying drawings. In principle of construction and operation the aeration tanks are substantially the same, and such differences as exist will be particularly mentioned hereinafter. For the moment, I will consider the two aeration tanks as identical and the following description will accordingly apply equally well to both tanks.

Figure 3:
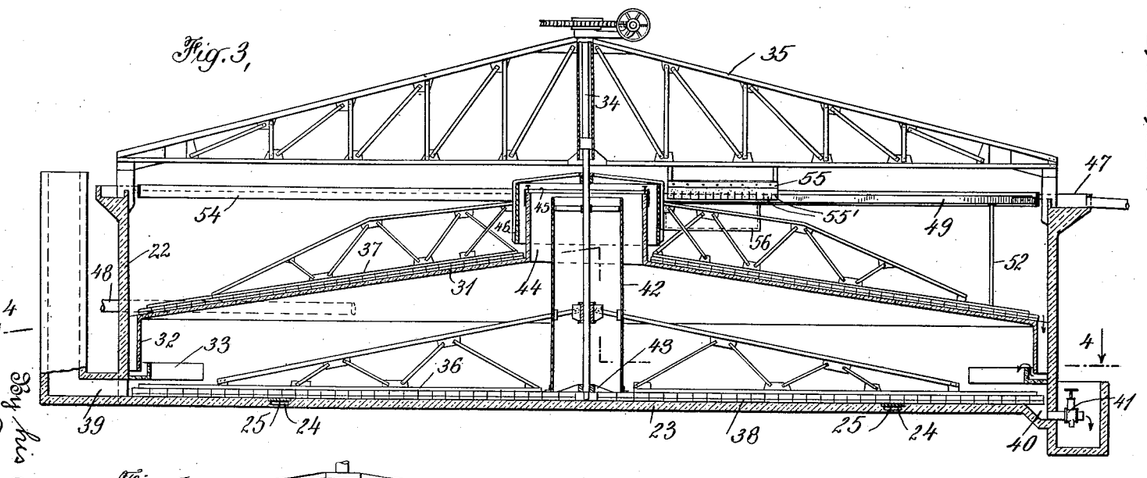
Fig. 3 is a sectional elevation of my improved aeration tank.

The aeration tank is substantially circular in section and comprises a cylindrical wall 22 and a substantially flat bottom 23. The tank may be built of wood, concrete or any other suitable material. The bottom of the tank is provided with appropriate means for the introduction into the tank of air in a finely disseminated state. To this end appropriate air compartments 24 are provided in the bottom of the tank and these compartments are covered over or closed by a porous medium 25 which will permit the passage therethrough of air under pressure but which, under the operating conditions, does not permit the passage of liquid. I have found filtros tile satisfactory in the construction of the porous bottom or medium of the aeration tank, but other materials are available for this purpose.

Figure 4:
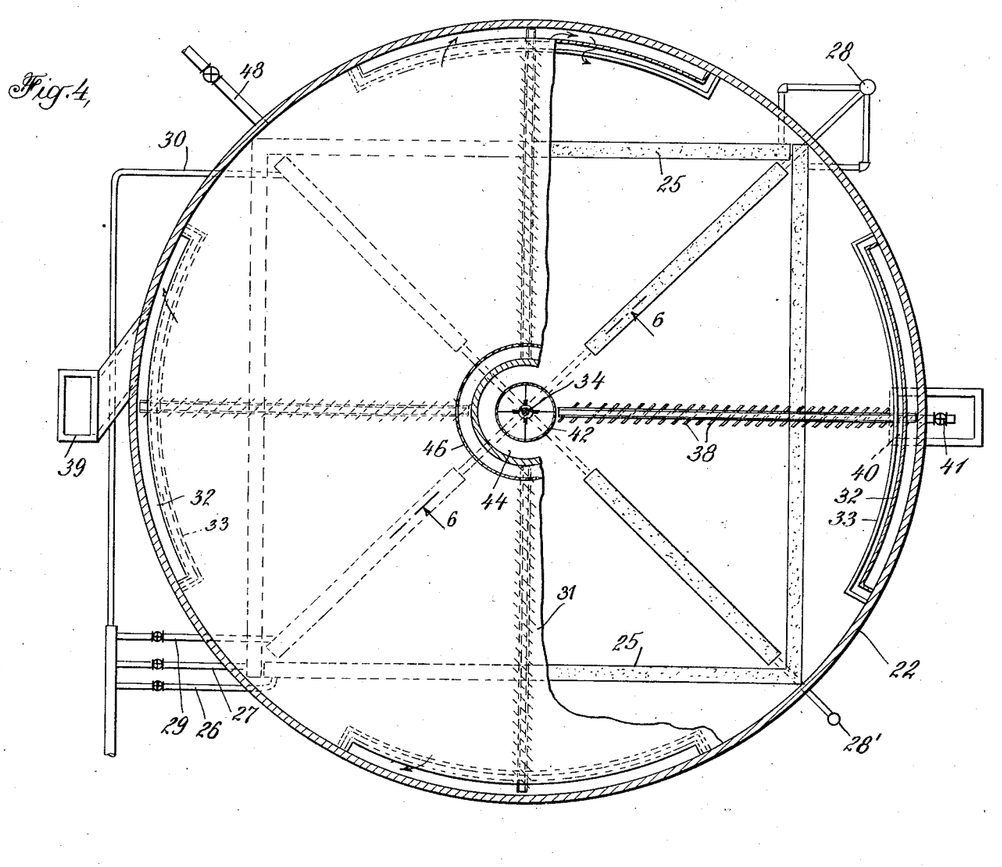
Fig. 4 is a sectional plan view, on the section line 4—4 of Fig. 3, of the improved aeration tank.

In the aeration tanks illustrated in the accompanying drawings, the porous bottom is arranged in the form of a hollow square, as will be clearly seen by reference to Fig. 4. The air compartments of two adjacent sides of this square are supplied with air under pressure from an air pipe 26, while the air compartments of the other two adjacent sides of this square are supplied by an air pipe 27. The extreme ends of the air compartments of these two adjacent sides of the hollow square are connected to a bleeder 28.

Ordinarily, the hollow square arrangement of the porous bottom just described will produce the necessary and desired aeration of the sewage. In Fig. 4 of the drawings, I have illustrated diagonally arranged porous bottoms in cases where greater aeration is desired. The air compartment of one of these diagonally arranged porous bottoms is supplied with air under pressure from an air pipe 29 while an air pipe 30 supplies the air compartment of the other diagonally arranged porous bottom. The air compartment of the last mentioned diagonal porous bottom is connected to a bleeder 28', while the air compartment of the other diagonally arranged porous bottom is connected to the bleeder 28.

A transverse tray or shelf 31, of annular configuration, is arranged intermediate the top and bottom of the tank. This tray slopes from the center toward the periphery of the tank and is provided at its outer edge with a plurality of downcast wells 32 communicating with the aeration chamber provided between the bottom 23 of the tank and the tray 31. The downcast wells 32 extend into troughs 33, thereby providing a seal which prevents the escape of air upwardly through the wells 32.

A rotating mechanism is operatively suspended within the tank and comprises a vertically disposed shaft 34 mounted in suitable bearings carried by a superstructure 35. The rotating mechanism has two sets of radially disposed arms 36 and 37, respectively. A series of plows or scrapers 38 are secured to each of the arms 36 and 37 and are arranged to move settled solid material from the center of the tank toward the periphery. The plows 38 attached to the radial arms 36 are disposed in operative relation with the bottom 23 of the tank, while the plows 38 attached to the radial arms 37 are disposed in operative relation to the top surface of the tray 31.

The inclined tray 31 divides the tank transversely into a lower aeration chamber and an upper sedimentation and decantation chamber. The raw secreened sewage coming from the pipe 21 is fed into the aeration chamber through an inlet pipe 39. The inlet pipe 39 is arranged to discharge the incoming sewage tangentially across the bottom of the aeration chamber, as will be clearly seen by reference to Figs. 1 and 4 of the drawings. A sump 40 is provided in the bottom 23 of the tank for the collection of solid substances of a nature unfitted for circulation with the sludge and sewage. For instance, sand, bones, or other coarse solids heavier than the liquid contents of the tank will be moved into the sump 40 by the rotating mechanism and may be discharged at suitable intervals through an appropriately valved outlet pipe 41.

A cylindrical pipe or tube 42 which may conveniently be made of sheet metal, surrounds the shaft 34 of the rotating mechanism and is secured thereto. The pipe 42 extends from near the top of the tank into proximity with the bottom thereof and serves as the downcast well in which the circulating liquor flows downwardly, as will be more fully described hereinafter. A conically shaped baffle 43 is mounted on the shaft 34 near the bottom of the pipe 42 and operates to diffuse and spread the downcoming liquor over the bottom of the tank. In a tank of such diameter that the currents generated in the operation thereof do not extend to the periphery of the tank, a radial distributing pipe or pipes arranged as close to the bottom of the tank as rotation will permit may be used for distributing the downflowing liquor.

Surrounding the upper portion of the pipe 42 is a cylindrical pipe or well 44. In the apparatus illustrated in the drawings, the pipe 44 is integral with the tray 31 and extends upwardly from the central opening in this tray to about the top of the pipe 42. The concentric pipes 42 and 44 are separated by an appropriate space which serves as the upcast well for the circulating liquor. The top of the pipe 44 is provided with an adjustable overflow lip 45, so that the effective height of this pipe with respect to the pipe 42 may be adjusted.

The pipe 44 is surrounded by a cylindrical baffle 46 appropriately spaced therefrom and secured to the rotating mechanism. The baffle 46 extends downwardly from an appropriate distance above the top of the pipe 44 into proximity with the tray 31 and serves the double function of preventing splashing over of the liquor escaping from the circuit and of conducting this escaping liquor in a relatively quiet manner into the sedimentation and decantation chamber.

The arrangement of the pipes 42, 44 and 46 provides three passages for the flow of liquor. The pipes 42 and 44 provide a circuit for the circulation of the liquor in the aeration compartment, while the pipes 44 and 46 provide a passage for the escape of a certain small fraction of the circulating liquor into the sedimentation and decantation chamber. The incoming screened sewage is discharged tangentially over the bottom of the aeration chamber. In the aeration chamber, the sewage is subjected to the levitating action of the finely disseminated air introduced into the liquor through the porous bottom. By the levitating or air lift action of the finely disseminated air, a circulation of the sewage is maintained upwardly through the passage provided between the pipes 42 and 44 and downwardly through the pipe 42. The top of the tube 42 is slightly lower, for example, one inch or so, than the top of the overflow lip 45 of the pipe 44, so that a very considerable portion of the liquor flowing upwardly through the annular passage between the two inner pipes 42 and 44 is returned to the aeration chamber.

A certain percentage of the liquor passing upwardly through the annular passage between the pipes 42 and 44 escapes over the lip of the pipe 44 and flows down through the passage provided between the pipes 44 and 46 into a body of similarly treated liquor undergoing sedimentation and decantation in the upper settling chamber of the tank. Sedimentation or settling takes place in the region of the tank above the intermediate tray 31 and outside the pipe 46. A certain amount of the liquor in this settling chamber returns to the aeration chamber through the downcast wells 32, and a certain amount of the liquor in the settling chamber is withdrawn by decantation into a peripheral launder 47. The quantity of liquor withdrawn through the launder 47 is equivalent to the amount of fresh liquor introduced into the aeration chamber through the pipe 39, and the amount of liquor flowing down the wells 32 is the difference between the fraction of the circulating liquor escaping over the top of the pipe 44 and the amount of fresh liquor introduced into the aeration chamber.

In the first aeration tank, it is not my intention in normal operation to withdraw the activated sludge and effluent as separate products, but rather to effect a very thorough and complete aeration of the sludge. Thus, in the first aeration tank an appropriate amount of material is withdrawn, corresponding to the amount of raw material fed into the tank, by means of the peripheral launder 47, and this withdrawn material is then conducted to the second aeration tank.

The operation of the second aeration tank is similar in principle to that of the first aeration tank. The overflow from the peripheral launder of the first tank is conducted to the inlet pipe 39 of the second tank. In the second tank aeration and circulation is maintained of substantially the same character as in the first tank. However, in the second tank the sludge is permitted to settle in the sedimentation and decantation chamber, and an appropriate amount of the settled sludge is withdrawn through the sludge discharge pipe 48. A substantially clear effluent is withdrawn through the peripheral launder of the second tank and run to waste, or, if desired, this effluent may be subjected to appropriate treatment for the recovery of such valuable substances as it may contain in solution.

The aeration and activation of the sludge in the second tank is conducted in substantially the same manner as described in connection with the first tank. Thus, the overflow liquor from the first tank is tangentially discharged across the bottom of the second tank through the inlet 39. Circulation of the liquor is maintained in the aeration chamber by the levitating action of the rising air bubbles, and a portion of the circulating liquor is permitted to escape into the superposed sedimentation and settling chamber.

Domestic sewage usually contains a certain small amount of fatty substances which are lighter than the sewage liquor and, if permitted to do so, will float to the top thereof. These fatty substances are objectionable from a fertilizer standpoint, and where the final sludge is to be used for fertilizing purposes it is desirable to remove the fatty substances from the sewage liquor. I find that substantially all of such fatty substances can be removed from the settling chamber of the first aeration tank, when treating domestic sewage in accordance with the principles of the present invention. To this end, I find it advantageous to provide the first aeration tank with a skimming mechanism which will remove from the sewage liquor floating fats, oils and similar substances of less specific gravity than the liquor.

Figure 5:
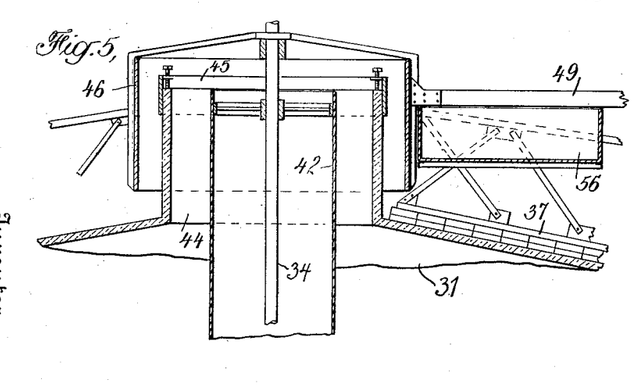
Figs. 5 and 6 are detailed sectional views illustrating certain features of the construction of the aeration tank.
Figure 6:
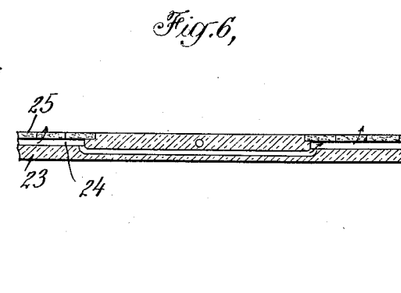

Referring now to Figs. 1, 3 and 5 of the accompanying drawings, it will be observed that the first aeration tank has an involute skimming member 49 operatively secured to the rotatable mechanism. The skimmer

49 is maintained under tension in the form of an involute by a tie-rod 50 secured between the ends of the skimmer and having an intermediate turnbuckle 51. A vertical support 52 is mounted on one of the radial arms 37 and is secured at its upper end to the outer end of the skimmer 49. At its outer end, the skimmer carries a flexible squeegee 53 which engages with the inside of a circular scum baffle 54.

A stationary skimming member 55 of involute configuration is secured to the framework or superstructure 35. The stationary skimming member 55 is constructed of two component parts, the upper of which is relatively rigid while the lower is flexible so as to permit the passage through the same of the rotatable skimming member 49. Thus, the upper or rigid portion of the stationary skimming member 55 may conveniently consist of an appropriately curved piece of iron to which are bolted depending pieces 55' of flexible material, such, for example, as rubber belting.

The rotating skimming member 49 is arranged to sweep the surface of the liquor in the settling chamber of the tank and to direct floating oils, fats and the like toward the center of the tank. When the rotatable skimming member 49 passes beneath the stationary skimming member 55, the floating oils, fats and the like are directed and discharged by the combined action of the two skimming members into a receptacle 56 which is appropriately secured to the rotating mechanism. The receptacle 56 is removable, and is positioned so that its top is above the level of the liquor in the settling chamber. When the receptacle 56 becomes filled with oils, fats and the like, it is removed and emptied or replaced by an empty receptacle. The oils, fats, and the like thus removed from the liquor may be subjected to any appropriate treatment for the recovery of such values as they may contain.

The rigid portion of the stationary skimming member 55 is positioned well above the plane of the liquor level in the settling chamber and sufficiently spaced from the upper surface of the rotatable skimming member 49 to permit the latter to pass freely therebeneath. The flexible portion of the stationary skimming member 55 is positioned in the path of movement of the rotatable skimming member 49, but due to its flexible character is readily pushed aside to permit the passage of the rotatable member 49. It will, of course, be understood that a plurality of stationary skimming members 55 may, if desired, be provided.

The rotating screening drum hereinbefore described requires practically no supervision. I have, however, encountered in practice two kinds of materials which tend to blind or obstruct the interstices of the screening medium. Feathers will not pass through the screen, and when they strike an interstice of the screen end-on the fronds of the feather hold it in the screen. The further cause of blinding which I have encountered is the growth of an aerobic bacterial jelly. I have found that by permitting the screen to revolve for a period of say two hours in dead liquor, these bacterial jellies die and are flushed off the screen which then becomes as clean as when first put in operation. Where a large screen is used or a battery of screens, a conveying device may be placed in the solids collecting compartment for mechanically removing the nitrogen-poor solid matter thrown into the compartment by the operation of the screen. In addition to raising the nitrogen content of the activated sludge, this screen has an important advantage in removing materials which would cause undigestible accumulations and would probably displace to some extent the nitrogenous material contained in the sewage.

The aeration of the sewage in the aeration tanks is very thorough and complete. The improved construction of tank hereinbefore described permits the use of practically the entire volume of the tank for the aeration operation. It will also be observed that there is an extremely rapid circulation through both the aeration chamber and sedimentation chamber. A further noticeable economy is effected by retaining a considerable portion of the very finely divided air bubbles in the circuit. These bubbles do not have time to burst when they reach the surface of the tank but return immediately downward through the downcast well or pipe.

A remarkable economy in air consumption is effected by aerating the sewage in the manner herein described. I attribute this economy in air consumption over what has been obtained heretofore in activated sludge processes to the following factors:

(1) Continued circulation of the air bubbles.

(2) Thorough mixing of the incoming sewage with a quantity of freshly aerated, activated sludge greatly in excess of the sewage.

(3) The greater detention period of the sewage in the aeration tank in proportion to the gross space occupied by reason of keeping the sludge in closed-circuit circulation within the tank.

(4) Longer period of contact between air and liquor without corresponding increase in depth by inducing a lateral flow of the bubbles.

Due to the rapid circulation of the sewage, there is a certain amount of short-circuiting to the discharge launder in the first unit.

This makes a second unit desirable. The second unit is operated on the same principle as the first. If desired, the area of porous bottom and amount of air used in the second aeration tank may be both less than in the first tank. In such a case, the central circulating wells are, of course, made proportionately smaller in the second unit, in order that the desired air lift effect may be maintained.

In the first aeration tank, the amount of solid material is automatically maintained by displacement. The proportion of solid material affects the settling rate. When this proportion increases, the settling rate becomes slower and automatically the solid material overflows until a balance is established. The reverse is true when the incoming sewage contains less solid matter.

In the second aeration tank, it is necessary to maintain an adequate settling rate. To this end, I have found it satisfactory to withdraw the sludge whenever a settling test shows a settling rate less than four feet per hour, or in an emergency whenever the sludge begins to rise in the tank. This withdrawn sludge is never returned to the circuit but is finally sedimented and the thickened sludge appropriately treated.

As previously stated, more than two aeration tanks may be connected in series. When using two tanks, as previously described, I find it advantageous to so proportion the work between these tanks that substantially seventy-five per cent. of the desired aeration and activation of the sludge takes place in the first tank, while the remaining twenty-five per cent. of the aeration takes place in the second tank. Where more than two tanks are connected in series, the relative work between these tanks will be appropriately proportioned.

The invention is of particular importance in the manufacture of fertilizer, since the activated sludge, when dehydrated, contains a very high percentage of nitrogenous matter in a condition admirably suited for fertilizing purposes. Thus, in actual practice, I have found that the final sludge contains upward of 7% of nitrogen, calculated on a dry basis in terms of ammonia, and in some instances contains as high as 9 to 10% nitrogen. This uniformly high nitrogen content of the final sludge, taken in conjunction with the increased amount of sludge obtained per unit volume of sewage treated, shows a greatly increased recovery of nitrogen by the method of the invention as compared with prior practices.

The process of the invention provides a satisfactory method of treating and disposing of the raw sewage as well as a profitable method for the manufacture of fertilizer. The labor required is only that of an attendant for watching the classifying and aeration units, and the supervision required for this purpose need not occupy all of the attendant's time. The cost of the raw materials necessary in the manufacture of the fertilizer, that is sulfuric acid and phosphate rock, would be realized in the value of the final product.

The improved method of treating sewage herein described, produces more uniformly satisfactory results than any other method with which I am acquainted. Moreover, the method of the invention is remarkably economical in the amount of air required per unit volume of sewage treated, and results in the production of a greater volume of sludge of increased total nitrogen content per unit value of sewage treated than any other process of which I am aware.

In the aerating tanks hereinbefore described for the practice of the invention, the sewage, by the substantially closed-circuit circulation provided, is rotated from the center of the tank outwardly so that the finely divided air does not escape to any considerable extent, and hence has a longer time to dissolve or otherwise function in the liquor, thus adding greatly to the efficiency and materially reducing the cost of treatment. Also, by the method of the invention, the sludge is kept in constant suspension and furnishes an excellent footing upon which organic growths may multiply.

In the actual practice of the invention, about 0.5 cubic foot of air per gallon of sewage has been found sufficient for the treatment of ordinary domestic sewage. This is a marked economy over prior methods which employ from about 3 to 4 cubic feet of air per gallon of sewage treated. Furthermore, by the method of the invention, the time of contact of the air with the liquid and the substantially complete suspension of the sludge not only serve to fix and render available much of the nitrogen in the sewage, but result, under appropriate conditions and environment, in the fixation of nitrogen blown in with the air.

I have found that the fixation of atmospheric nitrogen during the aeration of the sewage is promoted by maintaining in the sewage an environment favorable to the growth of nitrogen-fixing organisms, such as the bacillus *crenothrix*. In general, such an environment is provided by maintaining, among other conditions, a limited degree of alkalinity or basicity during the aeration of the sewage in the presence of activated sludge. For the satisfactory growth and propagation of *crenothrix*, the sewage should contain a certain amount of one or more non-toxic metallic salts, such, for example, as ferric oxide or carbonate, and if such salts are not naturally present in the sewage, they may be added thereto. The fixed atmospheric nitrogen may appear in either the sludge or the effluent, and for this reason, I prefer to describe the phenomenon as an enrichment or increase in the nitrogen content of the sewage as a whole, without particularly specifying whether the fixed atmospheric nitrogen is contained in the sludge or in the effluent. I have also found that the presence of bacillus *vorticella*, under the conditions and environment specified, results in an increased nitrogen content of the sludge.

I claim:

1. The method of treating sewage and similar liquors containing nitrogen-rich and nitrogen-poor solid matters, which comprises comminuting the nitrogen-rich solid matter contained in the liquor into particles of a smaller size than the nitrogen-poor solid matter, subjecting the liquor to a screening operation in the course of which the bulk of the liquor together with the major part of the nitrogen-rich solid matter passes through the screen, removing from the liquor during the screening operation solid matter poor in nitrogen, and subjecting the screened liquor containing the comminuted nitrogen-rich solid matter to biological clarification.

2. The method of treating sewage and similar liquors containing nitrogen-rich and nitrogen-poor solid matters, which comprises agitating and screening the liquor in the course of which the nitrogen-rich solid matter is selectively broken up into relatively small particles which pass through the screen together with the bulk of the liquor while the nitrogen-poor solid matter is unable to pass through the screen and is appropriately removed from the liquor, and subjecting the screened liquor containing the comminuted nitrogen-rich solid matter to biological clarification.

3. The method of treating sewage and similar liquors containing nitrogen-rich and nitrogen-poor solid matters, which comprises subjecting the liquor to a classifying treatment in the course of which substantially all of the nitrogen-rich solid matter is selectively comminuted and passed through a screen together with the bulk of the liquor leaving behind solid matter poor in nitrogen which is appropriately removed from the liquor, and subjecting the screened liquor containing the comminuted nitrogen-rich solid matter to biological clarification.

4. The method of treating sewage and similar liquors containing nitrogen-rich and nitrogen-poor solid matters, which comprises continuously supplying raw liquor to an appropriate body thereof, subjecting the liquor to a classifying treatment in the course of which the nitrogen-rich solid matter is comminuted and passed through a rotary screen together with the bulk of the liquor and continuously discharged from said body of liquor while solid matter poor in nitrogen is continuously removed from said body of liquor during the aforesaid screening operation, and subjecting the screened liquor containing the comminuted nitrogen-rich solid matter to biological clarification.

5. The method of treating sewage and similar liquors containing nitrogen-rich and nitrogen-poor solid matters, which comprises agitating and screening the liquor in the course of which substantially all of the nitrogen-rich solid matter is comminuted into relatively small particles which pass through the screen together with the bulk of the liquor leaving behind solid matter relatively poor in nitrogen, and subjecting the screened liquor containing the comminuted nitrogen-rich solid matter to biological clarification.

6. The method of treating sewage and similar liquors containing nitrogen-rich and nitrogen-poor solid matters, which comprises subjecting the liquor to a classifying treatment in the course of which substantially all of the nitrogen-rich solid matter is comminuted and passed through a screen together with the bulk of the liquid leaving behind solid matter poor in nitrogen, and subjecting the screened liquor containing the comminuted nitrogen-rich solid matter to aeration in the presence of activated sludge.

7. The method of treating sewage and similar liquors, which comprises subjecting the liquor in the presence of activated sludge to the action of finely disseminated air in such a manner as to produce by the levitating action of the air a continuous circulation of the liquor, permitting an appropriate fraction of said circulating liquor to escape from the circuit and supplying to the circuit an appropriate amount of raw liquor to maintain equilibrium in the operating conditions, and subjecting said escaping fraction of the liquor to sedimentation and decantation with the return of the settled liquor to the circuit and the withdrawal of the decanted liquor from further participation in the aforementioned operations.

8. The method of treating sewage and similar liquors, which comprises subjecting the liquor in the presence of activated sludge to the action of finely disseminated air in such a manner as to produce by the levitating action of the air a continuous circulation of the liquor and the retention in the circulating liquor of a substantial part of the finely disseminated air, premitting an appropriate fraction of said circulating liquor to escape from the circuit, and supplying to the circuit an appropriate amount of raw liquor to maintain equilibrium in the operating conditions.

9. The method of treating sewage and similar liquors, which comprises subjecting the liquor in the presence of activated sludge to the action of finely disseminated air in such a manner as to produce by the levitating action of the air a continuous circulation of the liquor and the retention in the circulating liquor of a substantial part of the finely disseminated air, permitting an appropriate small fraction of said circulating liquor to continuously escape from the circuit, and continuously supplying directly to the circuit an appropriate amount of raw liquor to maintain equilibrium in the operating conditions.

10. The method of treating sewage and similar liquors, containing nitrogen-rich and nitrogen-poor solid matters, which comprises subjecting the liquor to a classifying treatment in the course of which the nitrogen-rich solid matter is comminuted and passed through a screen together with the bulk of the liquid leaving behind solid matter poor in nitrogen, subjecting the screened liquor in the presence of activated sludge to the action of finely disseminated air in such a manner as to produce by the levitating action of the air a continuous circulation of the liquor and the retention in the circulating liquor of a substantial part of the finely disseminated air, permitting an appropriate fraction of said circulating liquor to escape from the circuit, and supplying to the circuit an appropriate amount of raw screened liquor to maintain equilibrium in the operating conditions.

11. The method of treating sewage and similar liquors, which comprises subjecting the liquor in the presence of activated sludge to the action of finely disseminated air in such a manner as to produce by the levitating action of the air a continuous circulation of the liquor, permitting an appropriate fraction of said circulating liquor to escape from the circuit, supplying to the circuit an appropriate amount of raw liquor to maintain equilibrium in the operating conditions, and subjecting said escaping fraction of the liquor to further aeration in the presence of activated sludge.

12. The method of treating sewage and similar liquors, which comprises maintaining by the levitating action of finely disseminated air in the presence of activated sludge a continuous circulation of said liquor in a circuit including two substantially vertical and adjacent paths in which the liquor flows upwardly and downwardly respectively, permitting an appropriate small fraction of the upwardly flowing liquor to escape from the circuit, and supplying near the bottom of the upwardly flowing liquor path an appropriate amount of raw liquor to maintain equilibrium in the operating conditions.

13. The method of treating sewage and similar liquors, which comprises subjecting the liquor in the presence of activated sludge to the action of finely disseminated air in such a manner as to produce by the levitating action of the air a continuous circulation of the liquor, permitting an appropriate fraction of said circulating liquor to escape from the circuit, supplying to the circuit an appropriate amount of raw liquor to maintain equilibrium in the operating conditions, supplying said escaping fraction of the liquor to a body of similarly treated liquor undergoing sedimentation and decantation, decanting from said body and withdrawing from further participation in the aforementioned operations an amount of liquor substantially equivalent to the raw liquor supplied to said circuit, and returning to said circuit from said body of liquor an amount of settled liquor substantially equivalent to the difference between said escaping fraction and said supply of raw liquor.

14. The method of treating sewage and similar liquors, which comprises subjecting the liquor in the presence of activated sludge to the action of finely disseminated air in such a manner as to produce by the levitating action of the air a continuous circulation of the liquor, permitting an appropriate fraction of said circulating liquor to escape from the circuit, supplying to the circuit an appropriate amount of raw liquor to maintain equilibrium in the operating conditions, supplying said escaping fraction of the liquor to a body of similarly treated liquor undergoing sedimentation and decantation, decanting from said body and withdrawing from further participation in the aforementioned operations an amount of liquor substantially equivalent to the raw liquor supplied to said circuit, returning to said circuit from said body of liquor an amount of settled liquor substantially equivalent to the difference between said escaping fraction and said supply of raw liquor, and subjecting said decanted liquor to further aeration in the presence of activated sludge.

15. The method of treating sewage and similar liquors, which comprises subjecting the liquor to a plurality of similar treatment operations in each of which the liquor is subjected in the presence of activated sludge to the action of finely disseminated air in such a manner as to produce by the levitating action of the air a continuous circulation of the liquor and the retention in the circulating liquor of a substantial part of the finely disseminated air and in which an appropriate fraction of the circulating liquor is permitted to escape from the circuit and an appropriate amount of fresh liquor is supplied to the circuit to maintain equilibrium in the operation conditions.

16. The method of treating sewage and similar liquors containing nitrogen-rich and nitrogen-poor solid matters, which comprises subjecting the liquor to a classifying treatment in the course of which substantially all of the nitrogen-rich solid matter is comminuted and passed through a screen together with the bulk of the liquid leaving behind solid matter poor in nitrogen, and subjecting the screened liquor containing the comminuted nitrogen-rich solid matter to a plurality of treatment operations in each of which the liquor is subjected in the presence of activated sludge to the action of finely disseminated air in such a manner as to produce by the levitating action of the air a continuous circulation of the liquor and in which an appropriate fraction of the circulating liquor is permitted to escape from the circuit and an appropriate amount of raw liquor is supplied to the circuit to maintain equilibrium in the operating conditions.

17. The method of treating sewage and similar liquors, which comprises subjecting the liquor in the presence of activated sludge to the action of finely disseminated air in such a manner as to produce by the levitating action of the air a continuous circulation of the liquor, permitting an appropriate small fraction of said circulating liquor to continuously escape from the circuit, continuously supplying to the circuit an appropriate amount of raw liquor to maintain equilibrium in the operating conditions, supplying said escaping fraction of the liquor to a body of similarly treated liquor undergoing sedimentation and decantation, decanting from said body and withdrawing from further participation in the aforementioned operations an amount of liquor substantially equivalent to the raw liquor supplied to said circuit, and continuously supplying said decanted liquor to a body of similarly treated liquor in which a continuous circulation of the liquor is maintained in the presence of activated sludge by the levitating action of finely disseminated air and in which an appropriate small fraction of the circulating liquor is continuously permitted to escape to a body of similarly treated liquor undergoing sedimentation and decantation.

18. The method of treating sewage and similar liquors, which comprises subjecting the liquor to a plurality of similar treatment operations each of which involves the steps of subjecting the liquor in the presence of activated sludge to the action of finely disseminated air in such a manner as to produce by the levitating action of the air a continuous circulation of the liquor, permitting an appropriate small fraction of said circulating liquor to escape from the circuit, supplying to the circuit an appropriate amount of fresh liquor to maintain equilibrium in the operating conditions, and supplying said escaping fraction of the liquor to a body of similarly treated liquor undergoing sedimentation and decantation.

19. The method of treating sewage and similar liquors containing nitrogen-rich and nitrogen-poor solid matters, which comprises subjecting the liquor to a classifying treatment in the course of which the nitrogen-rich solid matter is comminuted and passed through a screen together with the bulk of the liquid leaving behind solid matter poor in nitrogen, subjecting the screened liquor to a plurality of treatment operations each of which involves the steps of maintaining by the levitating action of finely disseminated air in the presence of activated sludge a continuous circulation of the liquor in a circuit including two substantially vertical and adjacent paths in which the liquor flows upwardly and downwardly respectively, permitting an appropriate small fraction of the upwardly flowing liquor to escape from the circuit, supplying to the circuit near the top of the downwardly flowing liquor path an appropriate amount of fresh liquor to maintain equilibrium in the operating conditions, and supplying the escaping fraction of the liquor to a body of similarly treated liquor undergoing sedimentation and decantation.

In testimony whereof I affix my signature.

CHARLES LEE PECK.